United States Patent [19]

Ashby et al.

[11] Patent Number: 4,876,131

[45] Date of Patent: Oct. 24, 1989

[54] CONTINUOUS FORM WITH RELEASABLE LABEL

[75] Inventors: Robert E. Ashby, Quakertown, Pa.; Walter G. Greig, Lewiston, N.Y.

[73] Assignee: Moore Business Forms, Inc., Grand Island, N.Y.

[21] Appl. No.: 233,373

[22] Filed: Aug. 18, 1988

Related U.S. Application Data

[63] Continuation-in-part of Ser. No. 153,946, Feb. 9, 1988, abandoned.

[51] Int. Cl.[4] ............................ B32B 3/10; B32B 7/06

[52] U.S. Cl. ........................................ 428/42; 428/78; 281/5; 282/12 A; 282/3 R; 282/DIG. 2

[58] Field of Search ........................ 428/40, 42, 77, 78, 428/41; 282/11.5 A, 11.5 R, 12 A, 12 R, DIG. 2, 2, 34; 281/5

[56] References Cited

U.S. PATENT DOCUMENTS

| | | | |
|---|---|---|---|
| 1,743,764 | 1/1930 | Fischer . | |
| 2,278,673 | 4/1942 | Savada et al. . | |
| 2,496,325 | 2/1950 | Wittgren . | |
| 3,312,005 | 4/1967 | McElroy . | |
| 3,394,799 | 7/1968 | Ritson et al. . | |
| 3,691,140 | 9/1972 | Silver . | |
| 3,857,731 | 12/1974 | Merrill, Jr. et al. . | |
| 3,869,333 | 3/1975 | McMaster . | |
| 3,896,249 | 7/1975 | Keeling et al. . | |
| 3,993,814 | 11/1976 | Cavender . | |
| 4,049,483 | 9/1977 | Loder et al. . | |
| 4,166,152 | 8/1979 | Baker et al. . | |
| 4,244,125 | 1/1981 | Corey . | |
| 4,513,039 | 4/1985 | Esmay . | |
| 4,627,994 | 12/1986 | Welsch . | |
| 4,662,971 | 5/1987 | Adams | 428/42 |
| 4,680,210 | 7/1987 | Corcoran | 428/42 |
| 4,696,706 | 9/1987 | Griffin et al. . | |

*Primary Examiner*—Alexander S. Thomas
*Attorney, Agent, or Firm*—Nixon & Vanderhye

[57] ABSTRACT

A continuous business form has a carrier sheet formed of conventional paper (i.e., without a wax or silicone coating) and a forms portion adhered to the carrier sheet by release adhesive (transfer adhesive) adhered to the underside of the forms portion. The forms portion may be peeled from the carrier sheet for application and adherence to another surface while the carrier sheet may be used as paper, for example, for use in impact printing processes.

9 Claims, 3 Drawing Sheets

CONTINUOUS FORM WITH RELEASABLE LABEL

RELATED APPLICATIONS

This application is a continuation-in-part of prior application Ser. No. 07/153,946, filed Feb. 9, 1988 now abandoned for Continuous Form with Releasable Label.

BACKGROUND AND SUMMARY OF THE INVENTION

The present invention relates to continuous business forms with releasable or peelable labels and particularly to continuous business forms comprised of a carrier sheet formed of a conventional paper composition, i.e., paper suitable for processing through business machines, and labels releasably adhered to the carrier sheet by transfer or release adhesive.

One type of a conventional business form comprises a carrier sheet on which peelable or releasable labels are adhered. The labels are adhered by use of conventional pressure sensitive adhesive. The labels may thus be peeled from the carrier sheet and applied to another surface using the adhesive. For example, address labels are conventionally adhered to a carrier sheet by conventional pressure sensitive adhesive. The address labels and carrier sheet are often disposed in a printer, i.e., a typewriter, so that printing may be applied to the label. Thereafter, the label may be peeled from the carrier sheet for application to another surface, for example an envelope, using the conventional pressure sensitive adhesive as the adhering medium.

In business form applications of this type, the carrier or backing sheet is conventionally formed by applying a wax or silicone coating to the sheet. This is necessary to enable the conventional acrylic based pressure sensitive adhesive applied to the label to release from the carrier sheet when the label is peeled therefrom and applied to another surface. Wax or silicon coated sheets, however, are expensive to manufacture and are normally discarded after the labels are removed. It is recognized that release or transfer adhesive has been used previously to adhere paper to other surfaces. For example, stock business forms like memo pads, such as message or telephone pads, conventionally use a release or transfer adhesive applied along a marginal portion of superposed paper sheets to adhere the paper sheets one to the other and thereby form a pad. However, to applicants knowledge, there has not been prior use of release or transfer adhesive in continuous business forms employing a carrier sheet formed of conventional paper of the type suitable for processing through business machines with a multiplicity of labels releasably adhered to the carrier sheet by the transfer adhesive.

In accordance with the present invention, there is provided a continuous business form comprised of a carrier sheet formed of a conventional paper composition suitable for processing through business machines on one or both of which surfaces is adhesively secured by means of release or transfer adhesive a plurality of peelable labels. The carrier sheet is preferably provided with a series of spaced holes along a side margin for use in conjunction with conventional printing apparatus. Thus, the labels are applied to conventional paper forming the carrier sheet by release or transfer adhesive carried by the labels. This enables the labels to be peeled from the carrier sheet for application to another surface and without affecting the characteristics of the carrier sheet surface in contact with the adhesive when the labels were adhered thereto. In this manner, the labels can be peeled from the conventional paper of the carrier sheet, applied to another surface or repeatedly reapplied to additional surfaces, while at the same time the conventional carrier sheet may be used for other purposes, for example, as draft paper.

It will be appreciated that the labels may be provided in any shape or configuration on the carrier sheet and that preferably the transfer or release adhesive is applied to the entirety of the undersurface of the labels applied to the carrier sheet. Thus, the adhesively backed forms portion, e.g., the labels, may be disposed on the forms carrier sheet with releasable or transfer adhesive and can be readily and easily separated from the carrier sheet notwithstanding that the carrier sheet is formed of a paper suitable for processing through business machines. The additional expense of coating carrier paper with silicone or wax is thereby avoided. Paper wastage and attendant cost incident to discarding coated carrier sheet paper is similarly avoided.

Accordingly, in a preferred embodiment of the present invention, there is provided a continuous business form comprising a continuous form carrier sheet formed of paper suitable for processing through business machines, a plurality of forms disposed on the carrier sheet and a transfer adhesive carried by the forms and disposed between the carrier sheet and the forms for release of the carrier sheet and the forms one from the other to enable the forms to be separated from the carrier sheet and adhered to another surface using the same adhesive. Preferably, the margin of the carrier sheet is punched to provide a plurality of openings spaced therealong and from one another for compatibility with conventional drive mechanisms for printers.

In another aspect of the present invention, there is provided a continuous form paper product comprised of a continuous form carrier sheet formed of paper suitable for processing through business machines, a plurality of forms disposed on the carrier sheet and means carried by the forms and disposed between the carrier sheet and the forms for releasably securing the carrier sheet and the forms one to the other including a releasable, reusable adhesive having a tack sufficiently high to maintain the carrier sheet and forms secured one to the other and sufficiently low to enable the forms and adhesive carrier to be separated from the carrier sheet without affecting the surface characteristics of the carrier sheet in contact with the adhesive and enabling the forms to be adhered to another surface using the adhesive. This also enables use of the carrier sheet similarly as paper suitable for processing through business machines may be used, for example, as draft paper.

In a still further aspect of the present invention there is provided a method of forming a continuous business form with peelable forms on a carrier sheet comprising the steps of providing a carrier sheet formed of conventional paper composition in a continuous sheet form, providing a plurality of forms in continuous sheet form, applying a transfer adhesive to one side of the forms, pressing the forms against the carrier sheet to adhere the sheet and the forms one to the other and cutting the sheet of forms on the carrier to provide discrete forms thereon.

In a still further aspect of the present invention there is provided a method of using a continuous business form with peelable labels on a carrier sheet including providing a carrier sheet formed of a paper suitable for processing through business machines and having a printable surface, providing labels fixed to the carrier sheet by transfer adhesive, peeling the labels from the carrier sheet, applying the labels to another surface by pressing the adhesive thereof against such other surface and printing on the carrier sheet.

Accordingly, it is a primary object of the present invention to provide novel and improved continuous business forms and methods of forming and using such continuous business forms having a forms portion, e.g., labels, releasably adhered to a carrier sheet by transfer adhesive and transferable therefrom for adherence to other surfaces, wherein the carrier sheet may be inexpensively constructed of a conventional paper composition for service as both a carrier sheet and as a substrate on which information may be printed. These and further objects and advantages of the present invention will become more apparent upon reference to the following specification, appended claims and drawings.

BRIEF DESCRIPTION OF THE DRAWING FIGURES

DETAILED DESCRIPTION OF THE DRAWINGS

Reference will now be made in detail to the present preferred embodiment of the invention, an example of which is illustrated in the accompanying drawings.

Figure 1:
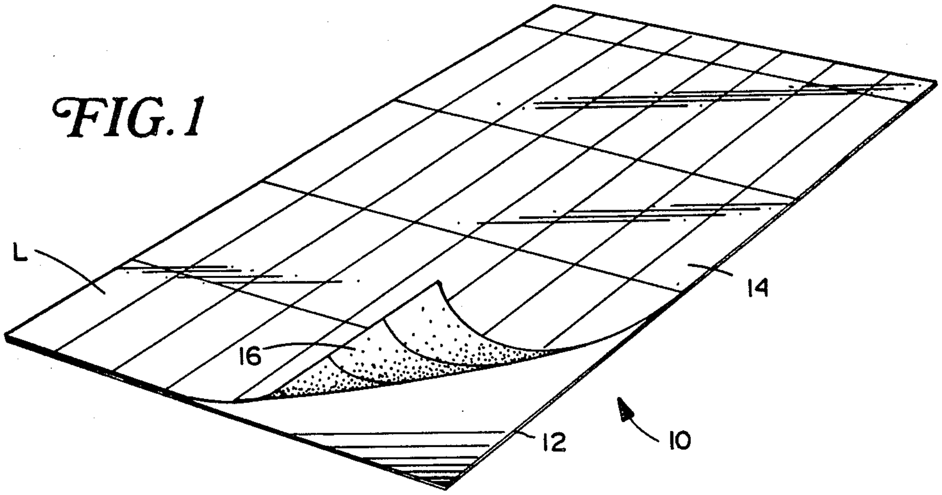
FIG. 1 is a perspective view of a continuous business form constructed in accordance with the present invention With a part of the forms portion peeled back from the carrier sheet and illustrating the adhesive therebetween.
Figure 2:
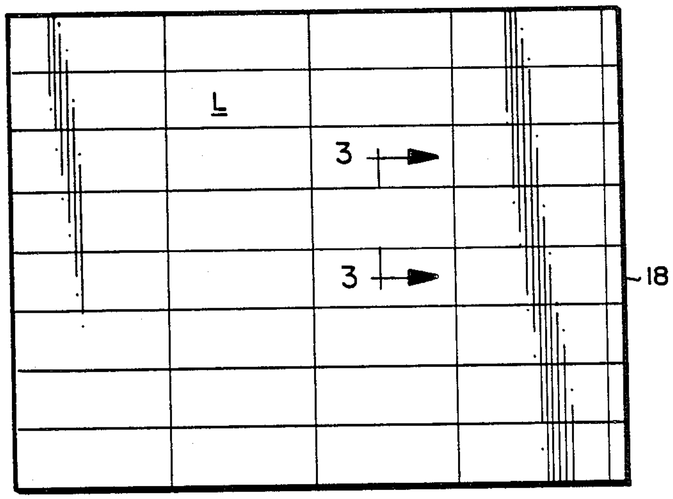
FIG. 2 is a top plan view of the continuous business form illustrated in FIG. 1.

Referring now to FIG. 1, there is illustrated a continuous business form constructed in accordance with the present invention and generally designated 10. Particularly, continuous business form 10 includes a continuous business form carrier sheet 12 which has adhered thereto and along one side thereof an adhesively backed forms portion 14. In this particular embodiment, forms portion 14 comprises a plurality of forms or labels L. The forms portion 14 or labels L are releasably adhered to the carrier sheet 12 by an adhesive 16 applied to the backside of the forms portion 14. As illustrated in FIG. 2, the continuous business form preferably has a marginal portion 8 along an edge thereof and which may be punched at longitudinal spaced positions therealong to facilitate use in printing processes.

In accordance with the present invention, the business form carrier sheet 12 is formed of paper having a conventional paper composition of such weight and quality suitable for processing through business machines. This excludes lightweight paper, groundwood paper, heavyweight paper (card stock) and the like. While this conventional paper is not coated with a wax or silicone coating, a coating of Quilon® or Silwet® is preferably applied to the paper on the side thereof on which the forms are applied. The release or transfer adhesive 16 may comprise a conventional release or transfer adhesive, for example, the transfer adhesive disclosed in U.S. Pat. Nos. 3,691,140, 3,857,731, or 4,166,512, or that used with commercially available products sold by Moore Business Forms, Inc. of Grand Island, N.Y. under the registered trademark "Notestix". These adhesive compositions are releasable from the underlying substrate and transferable with the overlying forms portion such that, upon application to the backside of the forms portion 14, the forms portion 14 may be releasable from the carrier sheet 12 and reusably applied to other surfaces. The term "transfer adhesive" or "release adhesive" as used in the specification and claims means adhesives that have a tack sufficiently high to maintain the carrier sheet and forms portion secured one to the other and sufficiently low to enable the forms portion together with the adhesive per se to be separated from the carrier sheet without affecting the surface character of the carrier sheet in contact with the adhesive and enabling the forms portion to be releasably and reusably adhered to one or more other surfaces using such adhesive.

Figure 3:
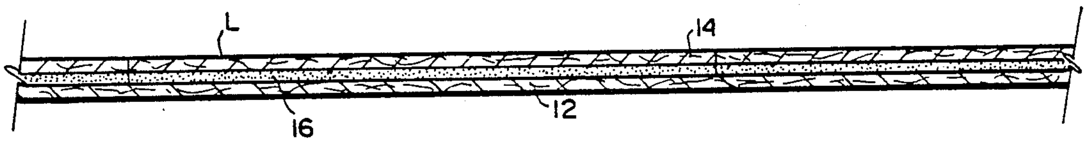
FIG. 3 is an enlarged cross sectional view thereof taken generally about on line 3—3 of FIG. 2.
Figure 4:
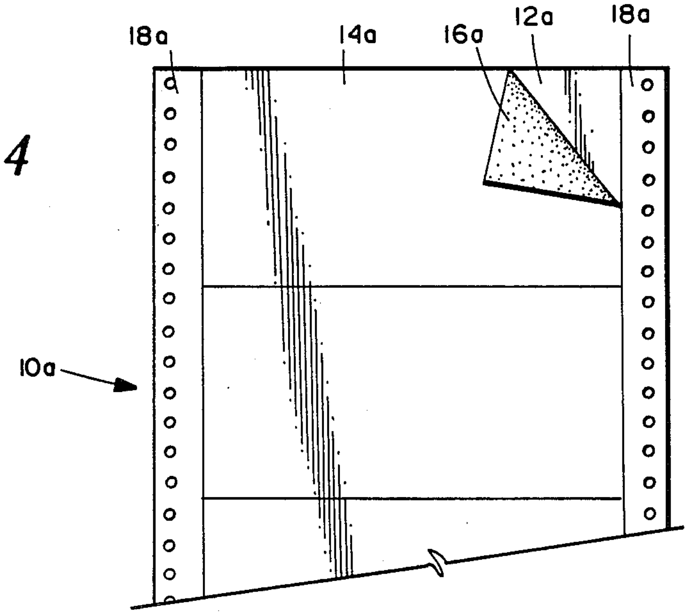
FIG. 4 is a plan view of another embodiment of a continuous business form constructed in accordance with the present invention.

Referring now to the embodiment hereof illustrated in FIG. 4, there is illustrated a continuous business form generally designated **10*a* having a carrier sheet 12*a* and a forms portion or label 14*a* adhered to the carrier sheet 12*a* by adhesive 16*a* applied to the underside of forms portion 14*a*. The adhesive 16*a*, as in the previous embodiment, is a release or transfer-type Importantly, the carrier sheet 12*a* is of similar paper composition to the carrier sheet 12 of the prior embodiment, i.e., carrier sheet 12*a* is formed of a paper suitable for processing through business machines without any coatings or other substances applied to its surface to facilitate removal of the forms portion and its adhesive backing. In this embodiment, the continuous business form has margins 18*a* along its opposite sides and punched holes are spaced therealong to facilitate machine use. Also, in this form, the forms portion 14*a* has a length dimension extending between the opposite sides of the carrier sheet as well as a substantial width dimension. This is in contrast to the relatively long narrow labels provided in the embodiment illustrated in FIGS. 1–3**.

Figure 5:
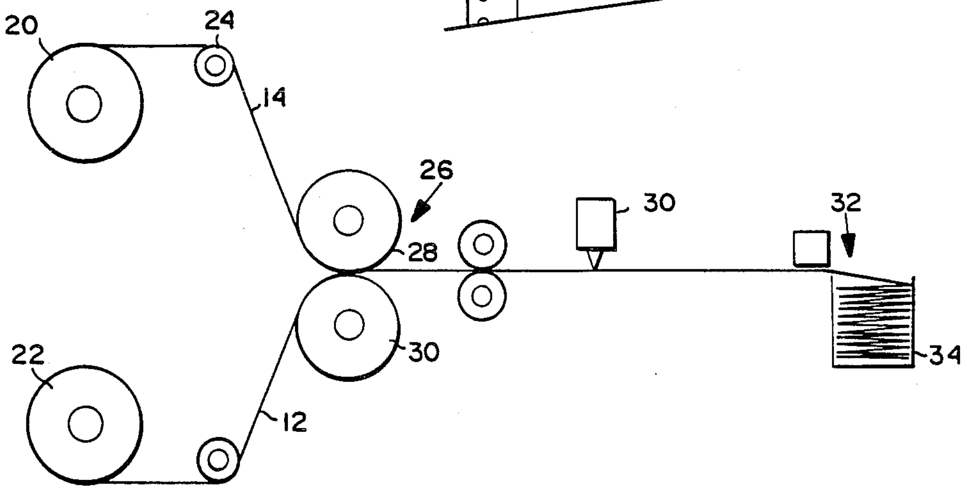
FIG. 5 is a schematic illustration of a method of forming the continuous business form hereof.

To manufacture the continuous business form hereof, there is provided, as illustrated in FIGURE 5, a pair of rolls 20 and 22, respectively, carrying the forms portion stock and paper carrier sheet stock 14 and 12, respectively. The forms portion stock 14 is fed past an adhesive application station 24 at which release or transfer adhesive is applied to the underside of forms portion 14. The stock from rolls 20 and 22 is then fed to a laminating station 26 where the adhesively backed forms portion 14 is adhered to the paper carrier sheet 12 by means of a pair of rollers 28 and 30. The laminate is then fed past a cutting station 30 for cutting forms portion 14 into the desired configuration without cutting paper carrier sheet 12. This cutting operation is conventional. The continuous finished product is then fed through a creasing and folding station, schematically illustrated at 32, whereby transverse creases are formed in the laminated stock to enable the stock to be folded in zigzag fashion for disposition in a container 34. It will be appreciated that the folding is correlated to the cutting station 30 such that the crease lines are formed between the form portions where the latter are separated one from the other. It will also be appreciated that the carrier sheet may be scored or perforated at longitudinally spaced positions therealong to afford discrete paper sheets releasably secured one to the other. The juncture between adjacent sheets may preferably lie coincident with the crease lines or the discrete sheets may be scored or perforated intermediate the crease lines as desired.

As illustrated in part in FIGS. 1 and 4, the forms portion 14 of the continuous business forms may simply be peeled from carrier sheet 12 and applied, using the adhesive 16 along its underside, to another surface. After the forms portion 14 has been removed, it will be appreciated that the paper carrier sheet 12, to which the forms portion 14 was previously applied, has the surface characteristics of conventional paper. That is, the surface of the paper carrier sheet is not affected by the application of the adhesive or the removal of the forms portion. Its surface is left clear for conventional use. Because paper of any conventional composition may be used (without release type coatings such as wax or silicone), the surface of the carrier sheet may be used as ordinary paper is used for example for receiving printing, or as scratch paper.

Figure 6:
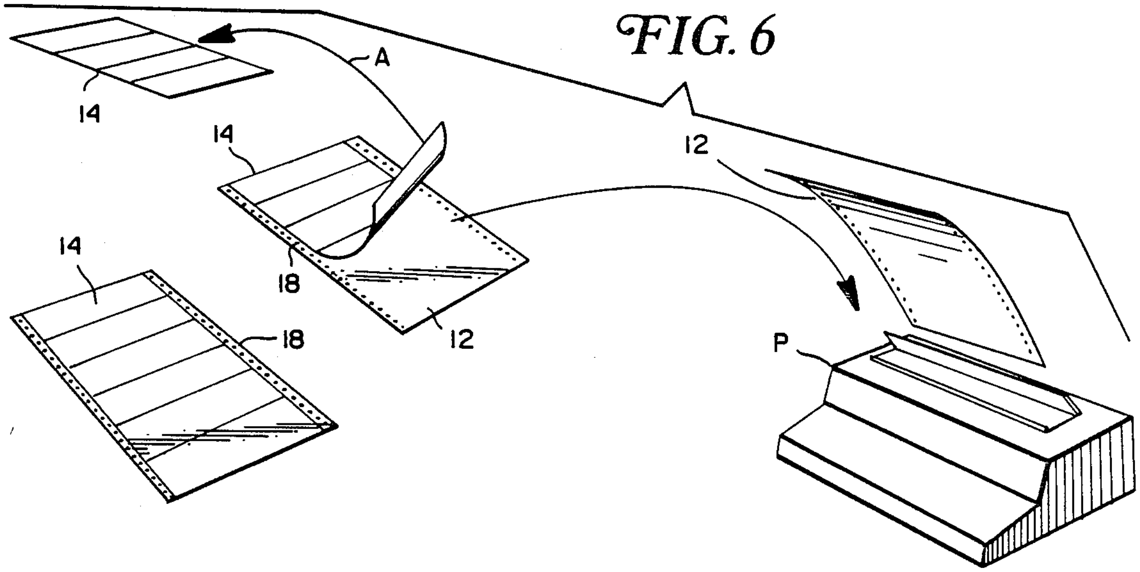
FIG. 6 is a schematic illustration of a method of using both parts of a continuous business form constructed in accordance with this invention.

This characteristic of the present invention is illustrated in FIG. 6 wherein the use of the continuous business form hereof is demonstrated. In that drawing FIG., forms portion 14 may be peeled from the carrier sheet 12 as illustrated by the arrow A. The resulting forms portion may be applied to other surfaces as desired. Carrier sheet 12 may likewise be used for example by disposing it in an impact printer P whereby information may be printed on the carrier sheet. Consequently, by forming the carrier sheet of conventional paper composition and using release or transfer adhesive, not only is the greater expense of providing a coating, e.g., a silicone or wax coating, eliminated, but the carrier sheet may be used as conventional paper.

Figure 7:
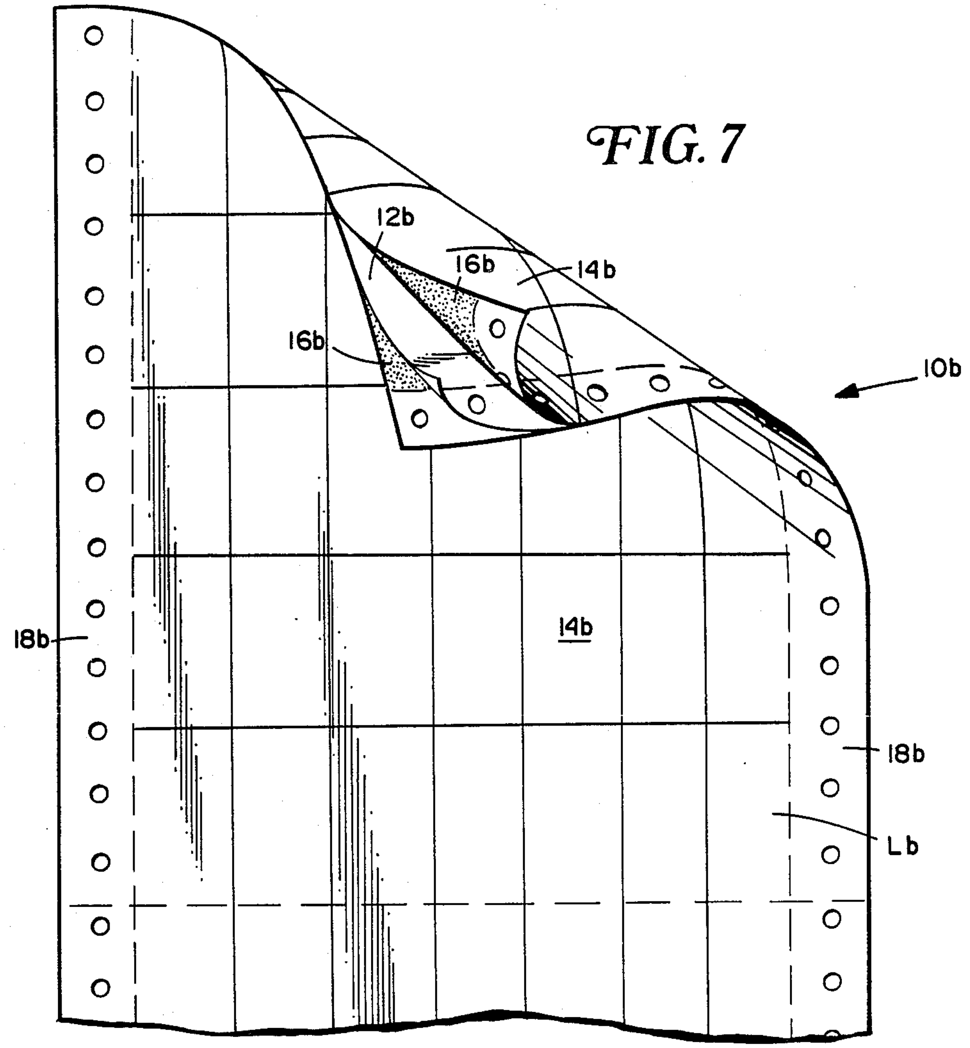
FIG. 7 is a perspective view of a continuous business form constructed in accordance with another embodiment of the present invention with parts of the form portions peeled back from opposite sides of the carrier sheet and illustrating the adhesive therebetween.
Figure 8:
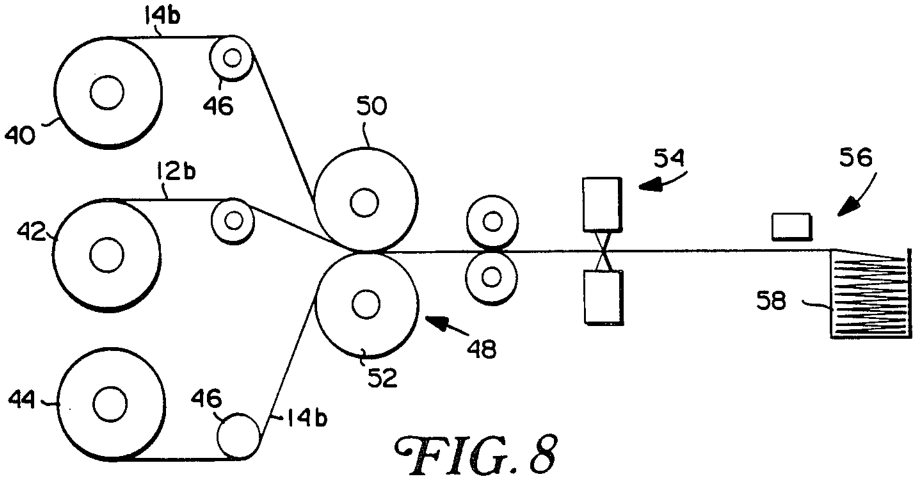
FIG. 8 is a schematic illustration of a method of forming the continuous business form hereof illustrated in FIG. 7.

Referring now to the embodiment of the invention hereof illustrated in FIGS. 7 and 8, there is illustrated a continuous business form, generally designated **1O*b*. In this embodiment, the continuous business form carrier sheet 12*b* has adhered thereto along each opposite side thereof an adhesively-backed forms portion 14*b*. As in the previous embodiment, the forms portion 14*b* comprises a plurality of forms or labels Lb. The labels Lb are releasably adhered to carrier sheet 12*b* by an adhesive 16*b* applied to the backside of each forms portion 14*b*. The opposite margins of the continuous business form 10*b* have marginal tear strips 18*b*** with suitable tractor openings to facilitate use of the form in printing machines.

As in the prior embodiments, the business form carrier sheet **12*b* is formed of paper having a conventional paper composition of such weight and quality suitable for processing through business machines and the release or transfer adhesive 16*b* may be of the type noted above in connection with the embodiment of FIG. 1. Preferably, the carrier sheet 12*b* is coated with Quilon ® or Silwet ® along its opposite sides prior to applying the forms portions 14*b* to the carrier sheet 12*b*. Thus, the business form 1O*b* illustrated in FIG. 7 is similar to the form illustrated in FIG. 1** with marginal tear strips applied and the forms portions applied to the opposite sides of the carrier sheet.

FIG. 8 schematically illustrates a method of forming the business form lOb illustrated in FIG. 7. In FIG. 8, three rolls 40, 42 and 44 are provided for carrying the forms portion stock and paper carrier sheet stock. Particularly, rolls 40 and 44 carry the forms portion stock **14*b* , while roll 42 carries the paper carrier sheet stock 12*b*. The Quilon ® or Silwet ® coating may be applied prior to forming the carrier sheet stock 12*b* into roll 42 or it may be applied as the carrier sheet stock 12*b* is removed from roll 42 during the process for manufacturing the present form. The forms portion stock 14*b* are fed past adhesive application stations 46 and 48, at Which release or transfer adhesive is applied to the side of the forms portion 14*b* in opposition to carrier sheet 12*b*. The stock from the rolls 40, 42 and 44 is then fed to a laminating station 48 where the adhesively-backed forms portions 14*b* are adhered to the paper carrier sheet 12*b* along its opposite sides by means of a pair of rollers 50 and 52. The laminate is then fed past a cutting station 54 for cutting the forms portions 14*b* on opposite sides thereof into the desired configuration without cutting the paper carrier sheet 12. The finished product is then fed through a creasing and folding station, schematically illustrated at 56, where transverse creases are formed in the laminated stock to enable the stock to be folded in zigzag fashion for disposition in a container 58. Folding is, of course, correlated to the cutting station 54 such that the crease lines are formed between the forms portion with the latter separated one from the other. It will be appreciated that once the finished product is folded, the forms portion lie in opposition one to the other within the container 58**.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A continuous form paper product, comprising:

a continuous form carrier sheet formed of paper uncoated with a release type coating on its opposite sides and per se suitable for processing through business machines;

first and second sets of a plurality of forms each, said first and second sets of forms being disposed on opposite sides of said carrier sheet, respectively; and transfer adhesive means disposed between said carrier sheet and said first set of forms on one side of said sheet and between said carrier sheet and said second set of forms on the opposite side of said sheet for releasably securing said carrier sheet and said form sets one to the other whereby, upon removal of the forms from the opposite sides of said carrier sheet, the carrier sheet per se may be processed through business machines.

2. A product according to claim 1, wherein said carrier sheet with forms secured thereto has a margin free of forms, said margin having a plurality of openings spaced on from the other therealong.

3. A product according to claim 1 wherein said carrier sheet with forms secured a margin free of forms.

4. A product according to claim 3 wherein said margin has a plurality of openings spaced one from the other therealong.

5. A product according to claim 1 wherein said forms are substantially separated one from the other along the carrier sheet.

6. A product according to claim 1 wherein said carrier sheet includes a plurality of discrete paper sheet releasably joined one to the other along adjoining edges and creased to enable said carrier sheet to be folded in zigzag fashion in a stack with said sheets lying generally parallel to one another, the forms on each side of each carrier sheet of said stack thereof lying in face to face relation with the forms on the next adjacent carrier sheets, respectively.

7. A product according to claim 6 wherein the entirety of each of said forms along their undersurfaces is adhesively secured to said paper carrier sheet.

8. A product according to claim 6 wherein said carrier sheet with forms secured thereto has a margin free of forms, said margin having a plurality of openings spaced on from the other therealong.

9. A product according to claim 1 wherein the entirety of each of said forms along their undersurface is adhesively secured to said paper carrier sheet.

* * * * *